United States Patent
Francisco et al.

(10) Patent No.: US 12,166,173 B2
(45) Date of Patent: Dec. 10, 2024

(54) SOLID ELECTROLYTE MATERIAL AND SOLID-STATE BATTERY MADE THEREWITH

(71) Applicant: Solid Power Operating, Inc., Louisville, CO (US)

(72) Inventors: Brian E. Francisco, Arvada, CO (US); Heather A. S. Platt, Golden, CO (US); Collin R. Becker, Boulder, CO (US); Joshua Buettner-Garrett, Arvada, CO (US)

(73) Assignee: Solid Power Operating, Inc., Louisville, CO (US)

( * ) Notice: Subject to any disclaimer, the term of this patent is extended or adjusted under 35 U.S.C. 154(b) by 0 days.

(21) Appl. No.: 17/734,874

(22) Filed: May 2, 2022

(65) Prior Publication Data
US 2022/0263127 A1    Aug. 18, 2022

Related U.S. Application Data

(63) Continuation of application No. 16/497,324, filed as application No. PCT/US2018/024617 on Mar. 27, 2018, now Pat. No. 11,349,149.

(60) Provisional application No. 62/478,141, filed on Mar. 29, 2017.

(51) Int. Cl.
*H01M 10/0562* (2010.01)
*H01M 10/052* (2010.01)

(52) U.S. Cl.
CPC ..... *H01M 10/0562* (2013.01); *H01M 10/052* (2013.01); *H01M 2300/0068* (2013.01)

(58) Field of Classification Search
CPC .......... H01M 10/0562; H01M 10/052; H01M 2300/0068
See application file for complete search history.

(56) References Cited

U.S. PATENT DOCUMENTS

| | | | |
|---|---|---|---|
| 2009/0142669 A1* | 6/2009 | Shinohara | H01M 10/0562 65/45 |
| 2012/0052382 A1 | 3/2012 | Yoshida et al. | |
| 2015/0270571 A1* | 9/2015 | Kambara | C03C 3/323 429/322 |

FOREIGN PATENT DOCUMENTS

| | | |
|---|---|---|
| CN | 103650231 A | 3/2014 |
| JP | 2016117640 A | 6/2016 |
| WO | 2010106412 A1 | 9/2010 |
| WO | 2013/005085 A1 | 1/2013 |

OTHER PUBLICATIONS

International Searching Authority, International Search Report and Written Opinion, issued for PCT/US2018/024617, mailed Aug. 8, 2018 (10 pages).

(Continued)

*Primary Examiner* — Jayne L Mershon
(74) *Attorney, Agent, or Firm* — Polsinelli PC; Blake A. Ronnebaum

(57) ABSTRACT

A solid electrolyte material comprises Li, T, X and A wherein T is at least one of P, As, Si, Ge, Al, and B; X is one or more halogens or N; A is one or more of S and Se. The solid electrolyte material has peaks at 17.8°±0.75° and 19.2°±0.75° in X-ray diffraction measurement with Cu-Kα (1,2)=1.5418 Å and may include glass ceramic and/or mixed crystalline phases.

7 Claims, 4 Drawing Sheets

(56) References Cited

OTHER PUBLICATIONS

European Patent Office, Extended European Search Report, issued for EP 18774275.4, mailed Oct. 28, 2020 (9 pages).
Rangasamy et al., An Iodide-Based $Li_7P_2S_8I$ Superionic Conductor, Journal of The American Chemical Society, 137, p. 1384-1387, 2015 (4 pages).

* cited by examiner

SOLID ELECTROLYTE MATERIAL AND SOLID-STATE BATTERY MADE THEREWITH

CROSS-REFERENCE TO RELATED APPLICATIONS

This application is a continuation of U.S. Nonprovisional application Ser. No. 16/497,324 filed Sep. 24, 2019 entitled "Solid Electrolyte Material and Solid-State Battery Made Therewith," which is a 371 application of Patent Cooperation Treaty Application No. PCT/US2018/024617 filed Mar. 27, 2018 entitled "Solid Electrolyte Material and Solid-State Battery Made Therewith," which claims benefit of priority from U.S. Provisional Application No. 62/478,141 filed Mar. 29, 2017 entitled "Solid Electrolyte Material and Solid-State Battery Made Therewith," all of which are hereby incorporated by reference in their entirety.

GOVERNMENT RIGHTS

This invention was made with government support under Department of Energy Contract Number DE-SC0013236. The government has certain rights in the invention.

FIELD

Various embodiments described herein relate to the field of solid-state primary and secondary electrochemical cells, electrodes and electrode materials, electrolyte and electrolyte compositions and corresponding methods of making and using same.

SUMMARY

In an embodiment, a solid electrolyte material comprises Li, T, X and A wherein T is at least one of P, As, Si, Ge, Al, and B; X is a halogen or N; A is one or more of S and Se. The solid electrolyte material has peaks at $2\theta=17.8°\pm0.75°$ and $19.2°\pm0.75°$ in X-ray diffraction measurement with Cu-K$\alpha$(1,2)=1.5418 Å and may include glass ceramic and/or mixed crystalline phases.

BRIEF DESCRIPTION OF DRAWINGS

The present disclosure may be understood by reference to the following detailed description taken in conjunction with the drawings briefly described below. It is noted that, for purposes of illustrative clarity, certain elements in the drawings may not be drawn to scale.

DETAILED DESCRIPTION OF ILLUSTRATED EMBODIMENTS

In the following description, specific details are provided to impart a thorough understanding of the various embodiments of the invention. Upon having read and understood the specification, claims and drawings hereof, however, those skilled in the art will understand that some embodiments of the invention may be practiced without hewing to some of the specific details set forth herein. Moreover, to avoid obscuring the invention, some well-known methods, processes, devices, and systems finding application in the various embodiments described herein are not disclosed in detail.

The ever-increasing number and diversity of mobile devices, the evolution of hybrid/electric automobiles, and the development of Internet-of-Things devices is driving greater need for battery technologies with improved reliability, capacity (Ah), thermal characteristics, lifetime and recharge performance. Currently, although lithium solid-state battery technologies offer potential increases in safety, packaging efficiency, and enable new high-energy chemistries, improvements are needed.

Figure 1:
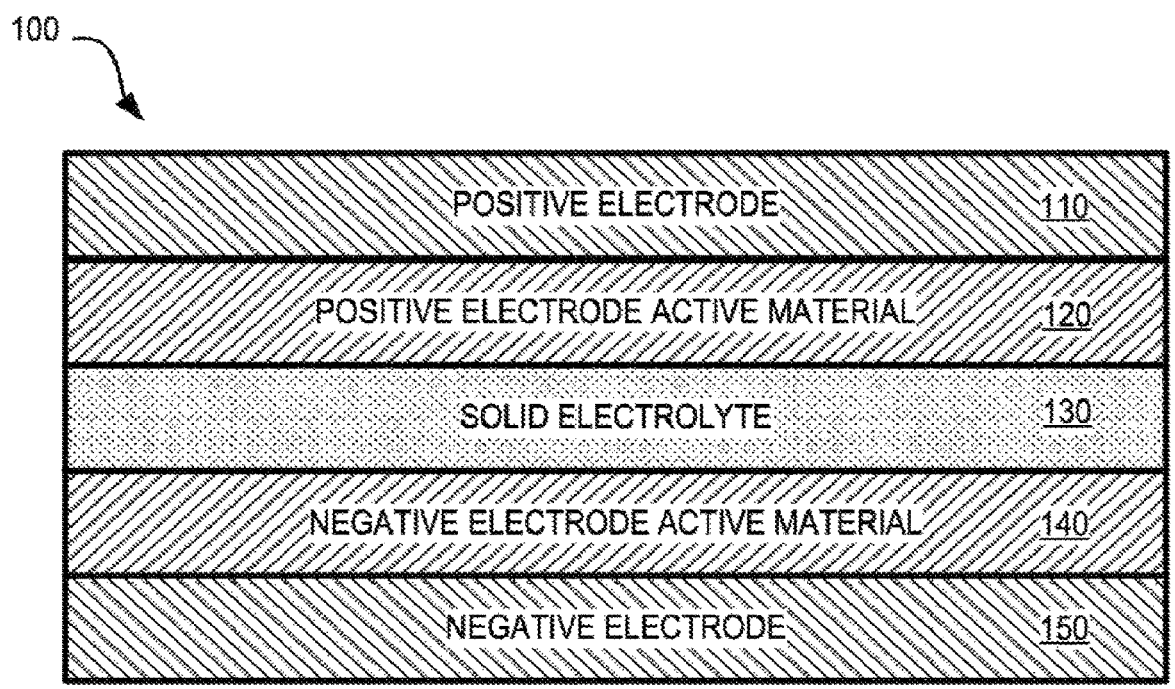
FIG. 1 is a schematic sectional view of an exemplary construction of a lithium solid-state electrochemical cell including a solid electrode composition, in accordance with an embodiment.

FIG. 1 is a schematic sectional view of an exemplary construction of a lithium solid-state electrochemical cell including an electrode composition of the present invention. Lithium solid-state battery 100 includes positive electrode (current collector) 110, positive electrode active material layer (cathode) 120, solid electrolyte layer 130, negative electrode active material layer (anode) 140, and negative electrode (current collector) 150. Solid electrolyte layer 130 may be formed between positive electrode active material layer 120 and negative electrode active material layer 140. Positive electrode 110 electrically contacts positive electrode active material layer 120, and negative electrode 150 electrically contacts negative electrode active material layer 140. The solid electrolyte compositions described herein may form portions of positive electrode active material layer 120, negative electrode active material layer 140 and solid electrolyte layer 130.

Positive electrode 110 may be formed from materials including, but not limited to, aluminum, nickel, titanium, stainless steel, or carbon. Similarly, negative electrode 150 may be formed from copper, nickel, stainless steel, or carbon. Negative electrode 150 may be omitted entirely if negative electrode active material 140 possesses adequate electronic conductivity and mechanical strength. Positive electrode active material layer 120 may include, at least, a positive electrode active material including, but not limited to, metal oxides, metal phosphates, metal sulfides, sulfur, lithium sulfide, oxygen, or air, and may further include a solid electrolyte material such as the solid electrolyte compositions described herein, a conductive material and/or a binder. Examples of the conductive material include, but are not limited to, carbon (carbon black, graphite, carbon nanotubes, carbon fiber, graphene), metal particles, filaments, or other structures. Examples of the binder include, but are not limited to, polyvinyl chloride (PVC) polyanilene, poly(methyl methacrylate) ("PMMA"), nitrile butadiene rubber ("NBR"), styrene-butadiene rubber (SBR), PVDF, or polystyrene. Positive electrode active material layer 120 may include solid electrolyte compositions as described herein at, for example, 5% by volume to 80% by volume. The thickness of positive electrode active material layer 120 may be in the range of, for example, 1 □m to 1000 □m.

Negative electrode active material layer 140 may include, at least, a negative electrode active material including, but not limited to, lithium metal, lithium alloys, Si, Sn, graphitic carbon, hard carbon, and may further include a solid electrolyte material such as the solid electrolyte compositions described herein, a conductive material and/or a binder. Examples of the conductive material may include those materials used in the positive electrode material layer. Examples of the binder may include those materials used in the positive electrode material layer. Negative electrode active material layer 140 may include solid electrolyte compositions as described herein at, for example, 5% by volume to 80% by volume. The thickness of negative electrode active material layer 140 may be in the range of, for example, 1 μm to 1000 μm.

Solid electrolyte material included within solid electrolyte layer 130 is preferably solid electrolyte compositions as described herein. Solid electrolyte layer 130 may include solid electrolyte compositions as described herein in the range of 10% by volume to 100% by volume, for example. Further, solid electrolyte layer 130 may contain a binder or other modifiers. Examples of the binder may include those materials used in the positive electrode material layer as well as additional self-healing polymers and poly(ethylene) oxide (PEO). A thickness of solid electrolyte layer 130 is preferably in the range of 1 μm to 1000 μm.

Although indicated in FIG. 1 as a lamellar structure, it is well known that other shapes and configurations of solid-state electrochemical cells are possible. Most generally, a lithium solid-state battery may be produced by providing a positive electrode active material layer, a solid electrolyte layer, and a negative electrode active material layer sequentially layered and pressed between electrodes and provided with a housing.

Figure 2:
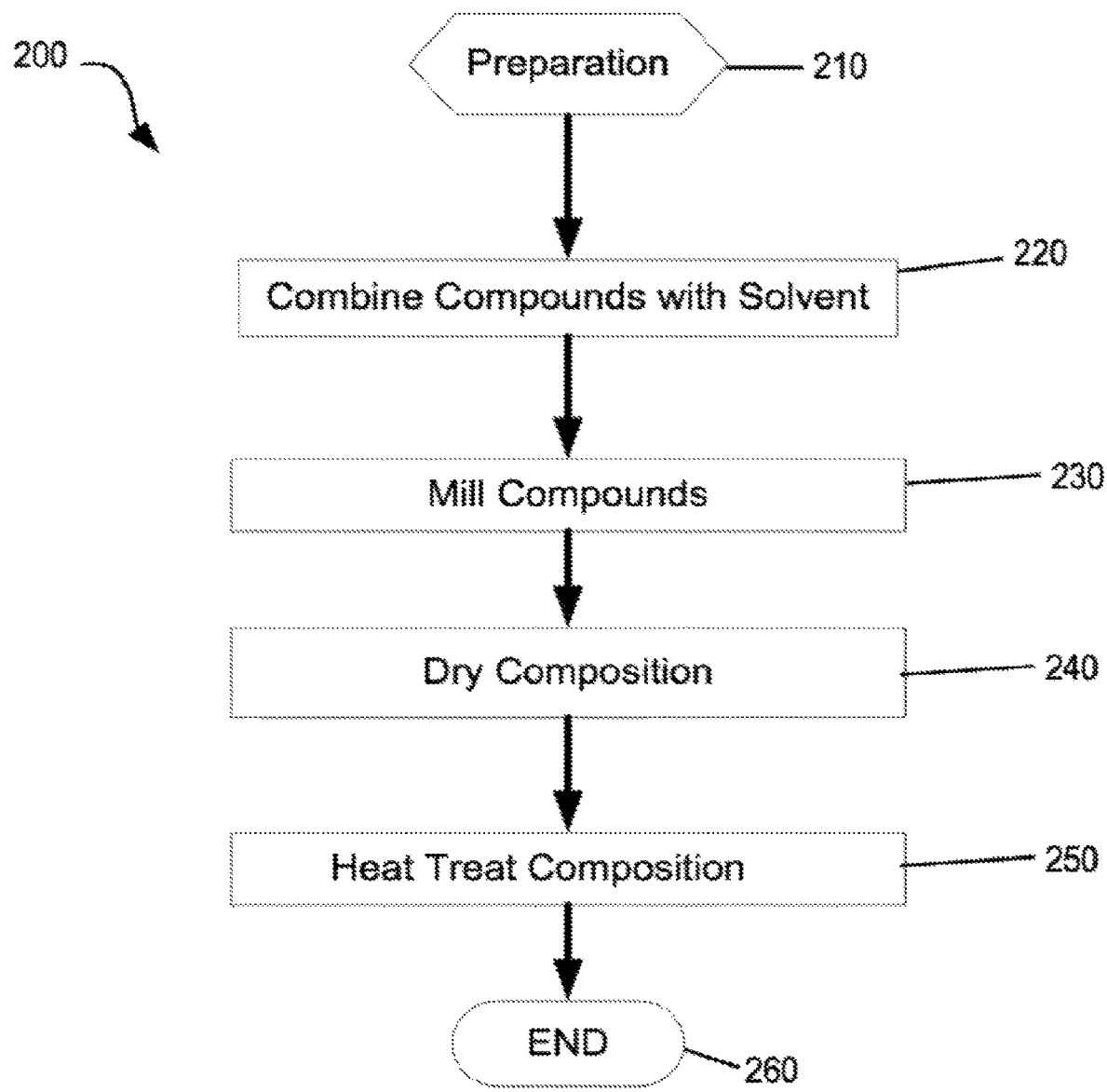
FIG. 2 is a flow chart of a process for producing a solid electrolyte composition, in accordance with an embodiment.

FIG. 2 is a flow chart of a process for producing a solid electrolyte composition useful for the construction of secondary electrochemical cells. Process 200 begins with preparation step 210 wherein any preparation action such as precursor synthesis, purification, and equipment preparation may take place. After any initial preparation, process 200 advances to step 220 wherein sulfur compounds, lithium compounds and other compounds, such as described herein, may be combined with an appropriate solvent and/or other liquids. Exemplary sulfur compounds may include, for example, elemental sulfur, phosphorus pentasulfide ($P_2S_5$), and lithium sulfide ($Li_2S$) typically in powder forms. Exemplary lithium compounds may include, for example, lithium metal (Li), lithium sulfide ($Li_2S$), lithium chloride (LiCl), and lithium nitride ($Li_3N$) typically in powder forms. Exemplary solvents may include, for example, but are not limited to, aprotic chain hydrocarbons such as heptane, aromatic hydrocarbons such as xylenes, and other solvents with a low propensity to generate hydrogen sulfide gas in contact with precursors or final electrolyte composition. The solvent is not particularly limited as long as it remains in the liquid state in part or in whole during the milling process at the desired milling temperature and does not participate in deleterious reactions with the solid electrolyte precursors or final solid electrolyte composition. The ratios and amounts of the various compounds is not specifically limited as long as the combination permits the synthesis of the desired composition and phase as indicated by the presence of specific X-ray diffraction features. The ratios and amounts may also vary according to specific synthesis conditions. For example, the ratio of solvent volume to precursor mass may need to be adjusted as solid electrolyte composition is adjusted to ensure complete milling of the precursors to generate the desired solid electrolyte phase discussed herein.

The amount of solvent added to the combination is not limited as long as the amount supports synthesis of the desired composition of solid electrolyte material. Multiple solvents may be mixed together with the noted compounds. Additional materials, such as co-solvents or polymers, may also be added during this step. Furthermore, the synthesis may be carried out with no solvent.

Next, in step 230 the composition may be mixed and/or milled for a predetermined period of time and temperature in order to create a solid electrolyte as described above. Mixing time is not specifically limited as long as it allows for appropriate homogenization and reaction of precursors to generate the solid electrolyte. Mixing temperature is not specifically limited as long as it allows for appropriate mixing and is not so high that a precursor enters the gaseous state. For example, appropriate mixing may be accomplished over 10 minutes to 60 hours and at temperatures from 20 to 120 degrees Celsius. Mixing may be accomplished using, for example, a planetary ball-milling machine or an attritor mill.

Next, in step 240, the composition may be dried in an inert atmosphere such as argon or nitrogen or under vacuum for a predetermined period of time and temperature. Following drying, heat treatment to crystallize the dried material may be performed during step 250. The temperature of heat treatment is not particularly limited, as long as the temperature is equal to or above the crystallization temperature required to generate the crystalline phase of the present invention. The material resulting from heat treatment step 250 may be single phase, and may also contain other crystalline phases and minor fractions of precursor phases.

Generally, the heat treatment time is not limited as long as the heat treatment time allows production of the desired composition and phase. The time may be preferably in the range of, for example, one minute to 24 hours. Further, the heat treatment is preferably conducted in an inert gas atmosphere (e.g., Argon) or under vacuum.

In final step 260, a completed composition may be utilized in the construction of electrochemical cells such as the cell of FIG. 1.

Other synthesis routes may be used as well. For example, a method comprising the mixing of suitable precursors providing components Li, T, X, and A in a solvent capable of causing reaction between the precursors, removal of the solvent, and heat treatment at a temperature equal to or greater than the crystallization temperature of the material may be used to synthesize the solid electrolyte material discussed herein.

Example 1

Precursors including 15.5 g $Li_2S$ (Lorad Chemical Corporation), 25.0 g $P_2S_5$ (Sigma-Aldrich Co.), and 9.5 g LiCl (Sigma-Aldrich Co.), are added to a 500 ml zirconia milling jar with zirconia milling media and compatible solvent (e.g. xylenes or heptane). The mixture is milled in a Retsch PM 100 planetary mill for 18 hours at 400 RPM. The material is collected and dried at 70° C. and then heated to 200° C. in inert (argon or nitrogen) environment. The resulting powder can then be used in a positive electrode active material layer, solid electrolyte layer, and/or negative electrode active material layer.

The sulfide solid electrolyte material resulting from the description of Example 1 comprises Li, T, X, and A, and has peaks at 17.8°±0.75° and 19.2°±0.75° in X-ray diffraction (XRD) measurement with Cu-Kα(1,2)=1.5418 Å which identify the novel crystalline phase. T is at least one kind of P, As, Si, Ge, Al, and B, A is at least one of S and Se, and X is one or more halogens or N. The general chemical composition may be denoted as $Li_{1-a-b-c-d}P_aT_bA_cX_d$, where values for a, b, c, and d may be in the ranges 0≤a≤0.129, 0≤b≤0.096, 0.316≤c≤0.484, 0.012≤d≤0.125, or preferably in the ranges 0.043≤a≤0.119, 0≤b≤0.053, 0.343≤c≤0.475, 0.025≤d≤0.125, or more preferably in the ranges 0.083≤a≤0.112, 0≤b≤0.011, 0.368≤c≤0.449, 0.051≤d≤0.125. The composition may be mixed phase material with other crystalline phases identified by XRD peaks at 2θ=20.2° and 23.6° and/or peaks at 2θ=21.0° and 28.0°, and/or peaks at 17.5° and 18.2°. The compositions may contain a crystalline phase associated with one or more lithium halides.

An exemplary subset of compositions can be defined as $Li_{4+3x+u*y-z}P_{1+x-y}T_yA_{4+4x-z}M_{1+z}$ where u is an integer representing the difference in preferred valence state between P and an element in class T (for example: $P^{5+}-Al^{3+}=2$), and T and A represent elements as described herein, and M is a halogen. Compositions may be in the range of 0≤x≤4, 0≤y≤4, 0≤z≤7, or preferably 0≤x≤3, 0≤y≤1, 0≤z≤2, or more preferably 1≤x≤3, 0≤y≤0.5, 0≤z≤1.

An exemplary composition is defined by x=1, y=z=u=0, A=S, and M=Cl in $Li_{4+3x+u*y-z}P_{1+x-y}T_yA_{4+4x-z}M_{1+z}$. Such a composition, after heat treatment, yields the crystalline phase of the present invention. The structure of this crystalline phase is conducive to high ionic conductivity, and the presence of halogens may aid in the formation of stable, low-resistance interfaces against lithium metal and high voltage cathode active materials.

Figure 3:
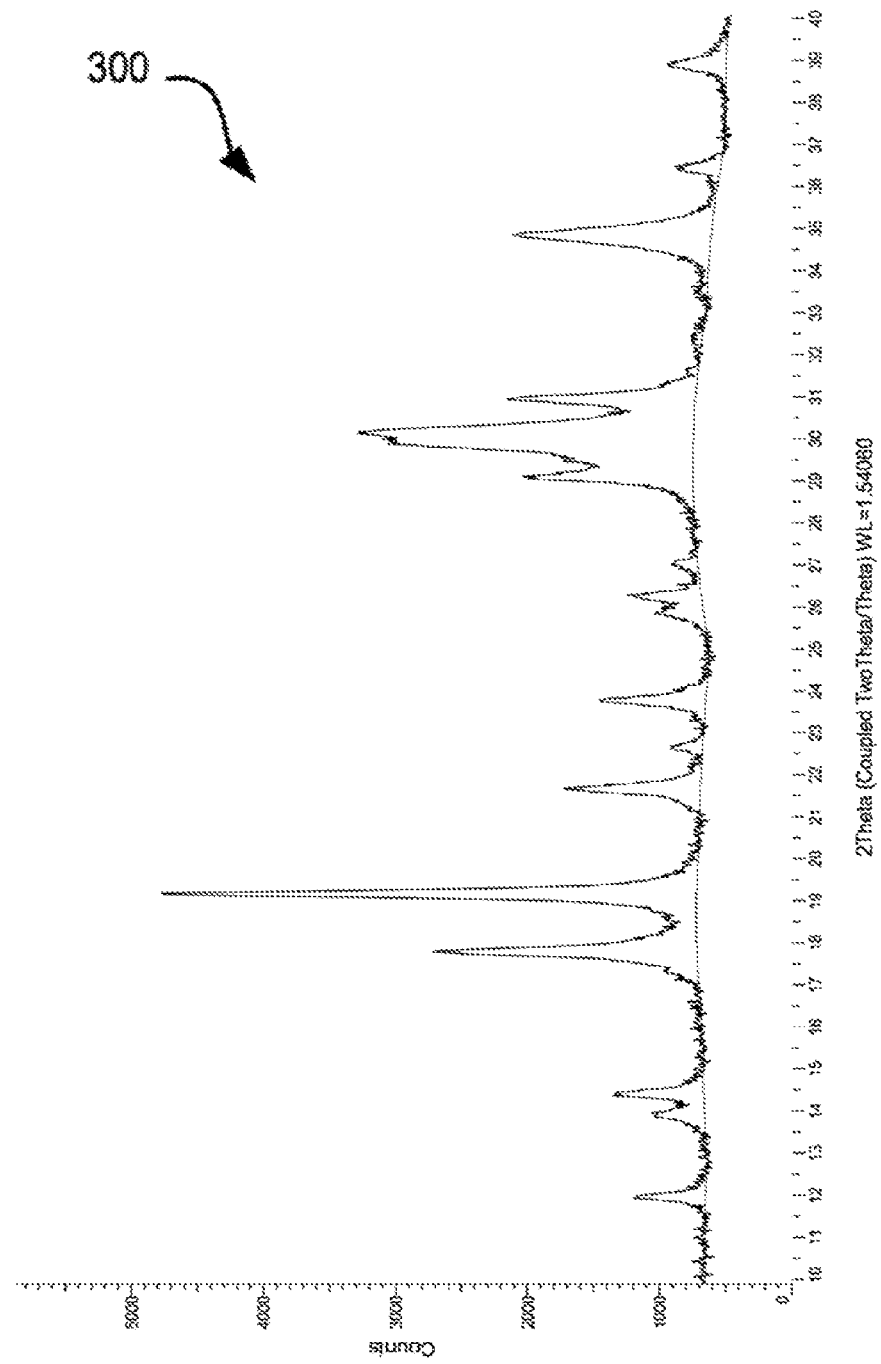
FIG. 3 is a plot of X-ray diffraction measurements of a solid electrolyte composition produced by the process indicated in FIG. 2, in accordance with an embodiment.

FIG. 3 is a plot of X-ray diffraction measurements of a solid electrolyte composition produced by the process indicated in FIG. 2 according to Example 1. X-ray diffraction (XRD) measurements show dominant novel peaks indicative of a previously unknown crystalline phase at 17.8°±0.75° and 19.2°±0.75° with Cu-Kα(1,2)=1.5418 Å. Other compositions may be mixed phase material with other crystalline phases identified by XRD peaks at 2θ=20.2° and 23.6° and/or peaks at 2θ=21.0° and 28.0°, and/or peaks at 17.5° and 18.2°, and/or peaks associated with one of more lithium halides.

Figure 4:
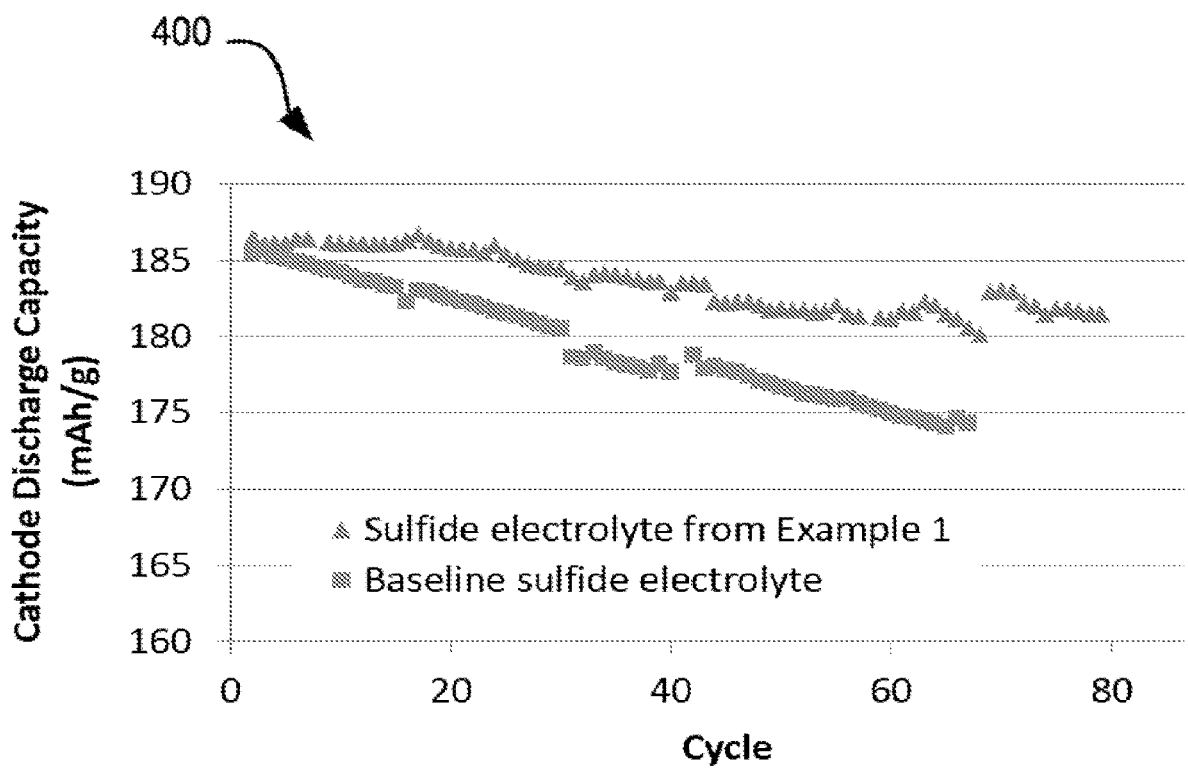
FIG. 4 is a plot indicating the improved capacity retention of a solid-state electrochemical cell using a solid electrolyte composition of the present invention compared to a prior art solid electrolyte composition, in accordance with an embodiment.

FIG. 4 is a plot indicating the improved capacity retention during cycling of solid-state electrochemical cells using a solid electrolyte composition of the present invention compared to a prior art solid electrolyte composition. Further studies of the compositions described herein indicate that the compositions including the novel phase deliver improved resistance and capacity stability at elevated temperatures and charge cutoff voltages. The electrolyte composition may also have mechanical properties conducive to improved physical contact and coverage of the cathode active material as evidenced by cathode capacity utilization near 100% during cycling. Measured examples of the compositions provide conductivities of approximately 0.6-2 mS/cm at room temperature for pure and mixed-phase electrolyte material in pellets compressed at room temperature. Higher conductivities may possibly be attained by an altered chemical stoichiometry and/or by compression at elevated temperatures or other processing methods and conditions.

Features described above as well as those claimed below may be combined in various ways without departing from the scope hereof. It should thus be noted that the matter contained in the above description or shown in the accompanying drawings should be interpreted as illustrative and not in a limiting sense. The above-described embodiments should be considered as examples of the present invention, rather than as limiting the scope of the invention. In addition to the foregoing embodiments of inventions, review of the detailed description and accompanying drawings will show that there are other embodiments of such inventions. Accordingly, many combinations, permutations, variations and modifications of the foregoing embodiments of inventions not set forth explicitly herein will nevertheless fall within the scope of such inventions. The following claims are intended to cover generic and specific features described herein, as well as all statements of the scope of the present method and system, which, as a matter of language, might be said to fall there between.

What is claimed is:

1. A solid electrolyte material comprising:
a crystalline phase comprising Li, P, X and A wherein X is one or more halogens or N; A is one or more of S and Se; and the crystalline phase has peaks at 17.8°±0.75° and 19.2°±0.75° in X-ray diffraction measurement with Cu-Kα(1,2)=1.5418 Å.

2. The solid electrolyte material of claim 1, wherein the crystalline phase may be described by the general formula:

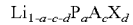

$Li_{1-a-c-d}P_aA_cX_d$ in which 0<a≤0.129, 0.316≤c≤0.484, 0.012≤d≤0.125.

3. The solid electrolyte material of claim 2, wherein a=0.111, c=0.444, d=0.056, A=S, and X=Cl.

4. The solid electrolyte material of claim 1, further comprising at least one of glass ceramic phases and mixed phases.

5. The solid electrolyte material of claim 1, wherein mixed phases comprise the crystalline phases containing peaks at 20.2°±0.75° and 23.6°±0.75°, and/or 21.0°±0.75° and 28.0°±0.75°, and/or 17.5°±0.75° and 18.2°±0.75° in X-ray diffraction measurement with Cu-Kα(1,2)=1.5418 Å.

6. The solid electrolyte material of claim 5, wherein a ratio of peak intensity at 19.2°±0.75° to a peak at 17.5°±0.75° is 1 or more.

7. A lithium solid-state battery comprising a positive electrode active material layer containing a positive electrode active material; a negative electrode active material layer containing a negative electrode active material; and a solid electrolyte layer disposed between the positive electrode active material layer and the negative electrode active material layer, wherein at least one of the positive electrode active material layer, the negative electrode active material layer, and the solid electrolyte layer comprises the solid electrolyte material according to claim 1.

\* \* \* \* \*